United States Patent
Caruba et al.

(10) Patent No.: US 7,323,691 B1
(45) Date of Patent: Jan. 29, 2008

(54) METHODS AND APPARATUS FOR PROTECTING AGAINST X-RAY INFILTRATION IN A SPECT SCANNER

(75) Inventors: James Frank Caruba, Bartlett, IL (US); Roger E. Arseneau, Buffalo Grove, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 11/519,411

(22) Filed: Sep. 12, 2006

(51) Int. Cl.
*G01T 1/16* (2006.01)

(52) U.S. Cl. .................................... 250/363.04

(58) Field of Classification Search ............ 250/363.04
See application file for complete search history.

(56) References Cited

U.S. PATENT DOCUMENTS

| 3,011,057 A | 11/1961 | Auger |
| 5,448,609 A | 9/1995 | Couch et al. |
| 6,124,595 A | 9/2000 | Engdahl et al. |
| 6,661,865 B1 * | 12/2003 | Popilock ...................... 378/19 |
| 6,670,614 B1 * | 12/2003 | Plut et al. .............. 250/363.04 |
| 2004/0036026 A1 | 2/2004 | Engdahl et al. |

* cited by examiner

*Primary Examiner*—David Porta
*Assistant Examiner*—Marcus H Taningco
(74) *Attorney, Agent, or Firm*—Peter L. Kendall

(57) ABSTRACT

Methods and apparatus provide for determining whether X-rays produced by a computer tomography (CT) scanner have infiltrated a single photon emission computed tomography (SPECT) scanner and shutting down at least one of a power source to one or more photo-multiplier tubes (PMTs) of the SPECT scanner, and an X-ray source of the CT scanner, when the determination is affirmative.

31 Claims, 7 Drawing Sheets

METHODS AND APPARATUS FOR PROTECTING AGAINST X-RAY INFILTRATION IN A SPECT SCANNER

BACKGROUND

The present invention generally relates to a system and method for providing gamma event detection and X-ray detection systems in an integrated environment and, more particularly, to detecting whether X-rays are inadvertently incident upon the gamma ray detection system.

There are two distinctive types of imaging systems in contemporary nuclear medicine. One type may employ gamma scintillation cameras (GSCs), so-called "position sensitive" continuous-area detectors. The other type of imaging system involves computed tomography ("CT").

The GSCs are primarily used to measure gamma events produced by very low-level radioactive materials (called radionuclides or radiopharmaceuticals) that have been ingested by, or injected into, a patient. The signals from the GSCs are used to generate images of the anatomy of organs, bones or tissues of the body and/or to determine whether an organ is functioning properly. The radio pharmaceuticals are specially formulated to collect temporarily in a certain part of the body to be studied, such as the patient's heart or brain. Once the radio pharmaceuticals reach the intended organ, they emit gamma rays that are then detected and measured by the GSCs.

Computed tomography systems generate an infinite set of X-ray beam projections through an object to be examined. The resultant detected X-ray data are computer processed to reconstruct a tomographic image-slice of the object. CT systems subject the object under examination to one or more pencil-like X-ray beams from many directions. The X-ray beams passing through the object are attenuated by various amounts, depending upon the nature of the object traversed (e.g., bone, tissue, metal, etc.). One or more X-ray detectors, disposed on the far side of the object, receive these beams and provide analog output signals proportional to the strength of the incoming X-rays. Each detector output is then digitized and computer processed to help produce an image of a slice of the object.

While it may be desirable to integrate a GSC system and a CT system into one piece of equipment (or at least to position such systems in relatively close proximity), a significant problem arises when this is done. In particular, if any X-rays of significant magnitude from the CT system infiltrate the GSC, at best the output of the GSC will be skewed. Indeed, a GSC includes a large area scintillation crystal, which functions as a gamma ray detector and is typically sodium iodide doped with a trace of thallium (NaI(Tl)). The crystal converts high-energy photons (e.g., gamma rays and X-rays) into lower energy photons, i.e., visible light. The relatively high, and constant, energy profile of X-ray events (as compared with gamma ray events) will likely drive the crystal significantly more than would gamma rays, thereby skewing the detection function of the GSC. More likely, the relatively sensitive photochemistry of the scintillation crystal will be over driven by the X-rays and may take a very long time (sometimes hours) to settle and again become useful in measuring gamma rays. At worst, the crystal may be permanently damaged from excessive levels of X-ray radiation.

Accordingly, there is a need in the art for new methods and apparatus for providing an integrated CGS and CT system which can detect whether X-ray events have begun infiltrating the CGS detection circuitry and take corrective action.

SUMMARY OF THE INVENTION

In accordance with one or more embodiments of the present invention, a method includes: determining whether X-rays produced by a computer tomography (CT) scanner have infiltrated a single photon emission computed tomography (SPECT) scanner; and shutting down at least one of: (i) a power source to one or more photo-multiplier tubes (PMTs) of the SPECT scanner; and (ii) an X-ray source of the CT scanner, when the determination is affirmative. The CT scanner and the SPECT scanner may be integrated in a single piece of equipment.

The step of determining whether there has been X-ray infiltration may include determining whether one or more output signals from the PMTs of the SPECT scanner indicate X-ray infiltration. For example, an indication of a respective amplitude envelope for each of the one or more output signals from the PMTs may be obtained a determination of whether the respective amplitude envelopes return to or toward a reference level within a time interval. The reference level may be zero volts. The determination of whether the one or more output signals from the PMTs indicate X-ray infiltration may be considered affirmative when the respective amplitude envelopes do not return to or toward the reference level within the time interval. The time interval may be between about 1 ms to about 100 ms (such as about 40-50 ms).

In an alternative methodology, the step of determining whether the one or more output signals from the PMTs indicate X-ray infiltration includes obtaining an indication of a respective energy level for each of the one or more output signals from the PMTs over a time interval. A determination is then made as to whether the respective energy levels for the one or more output signals from the PMTS exceed a threshold. The threshold is preferably substantially higher than expected energy levels of the one or more output signals from the PMTs in response to a presence of gamma rays. The determination of X-ray infiltration may be considered affirmative when the respective energy levels for the one or more output signals from the PMTS exceed the threshold. The time interval may be between about 1 ms to about 100 ms (such as about 40-50 ms).

In an alternative methodology, the step of determining whether the one or more output signals from the PMTS indicate X-ray infiltration includes obtaining an indication of an afterglow of a scintillation crystal of the SPECT scanner. The determination that X-ray infiltration may be considered affirmative when the afterglow exceeds a threshold. The threshold is preferably substantially higher than an expected afterglow of the scintillation crystal in response to a presence of gamma rays.

Other aspects, features, advantages, etc. will become apparent to one skilled in the art when the description of the exemplary embodiments of the invention herein is taken in conjunction with the accompanying drawings.

BRIEF DESCRIPTION OF THE DRAWINGS

For the purposes of illustrating the various aspects of the embodiments of the invention, there are shown in the drawings forms that are exemplary, it being understood, however, that the embodiments of the invention are not limited to the exemplary embodiments shown.

DETAILED DESCRIPTION OF EXEMPLARY EMBODIMENTS

Figure 1:
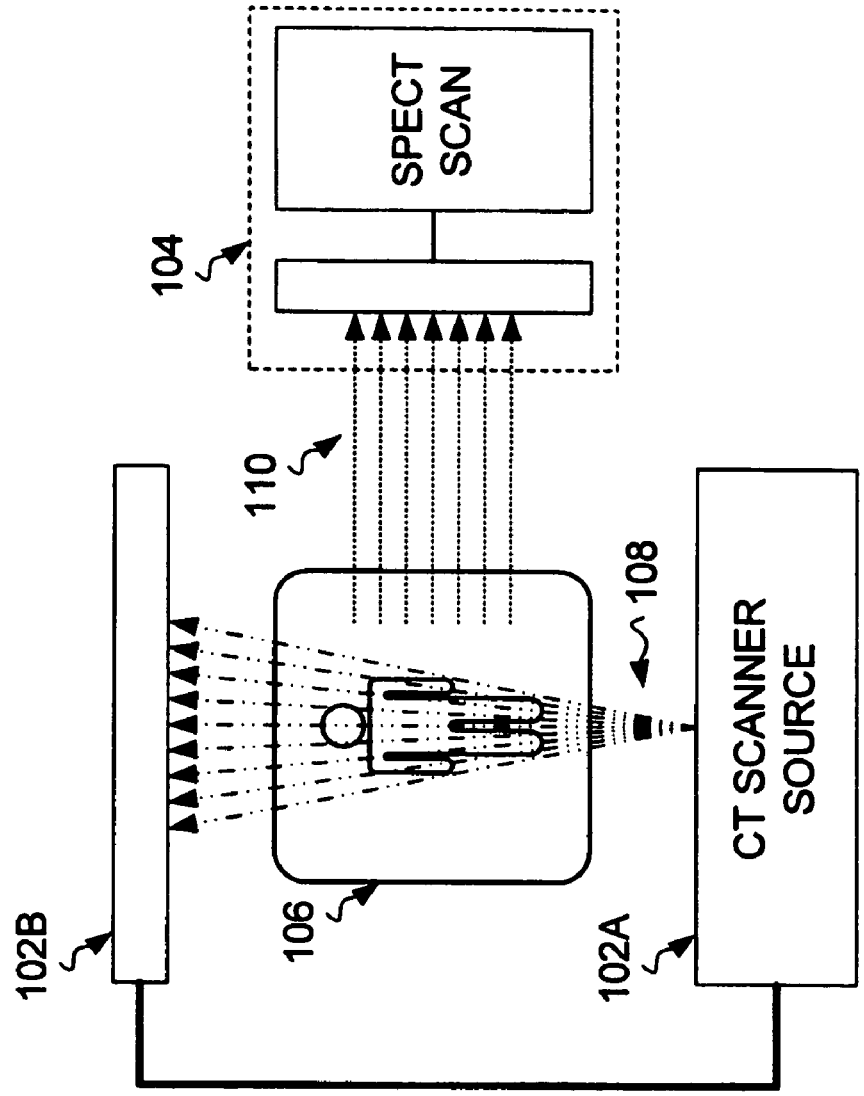
FIG. 1 is a block diagram of a combined diagnostic system employing both a SPECT scanner and a CT scanner in accordance with one or more embodiments of the present invention.

With reference to the drawings where like numerals indicate like elements, there is shown in FIG. 1 a block diagram of a diagnostics system 100 that integrates a SPECT scanning capability with a CT scanning capability. The diagnostics system 100 includes a CT scanner 102 and a SPECT scanner 104 that operate to provide images of the anatomy of a patient 106.

The CT scanner 102 includes a CT scanner source 102A (of X-rays 108) and a detection array 102B located generally diametrically opposite to the CT scanner source 102A with the patient 106 therebetween. The detection array 102B is responsive to X-rays 108 emanating from the CT scanner source 102A and passing through the patient 106. The SPECT scanner 104 includes gamma ray detection circuitry and post processing circuitry that will be discussed in more detail hereinbelow. The SPECT scanner 104 is responsive the gamma rays 110 emanating from radionuclides within the patient 106.

As discussed above, the CT scanner source 102A presents a potential hazard to the SPECT scanner 104 inasmuch as stray X-rays therefrom may stun (or damage) the gamma ray detection circuitry of the SPECT scanner 104. Thus, the diagnostics system 100 includes shut down circuitry that is operable to determine whether X-rays produced by the CT scanner source 102A have infiltrated the SPECT scanner 104, and to shut down one or more portions of the system 100 when the determination is affirmative.

Figure 2:
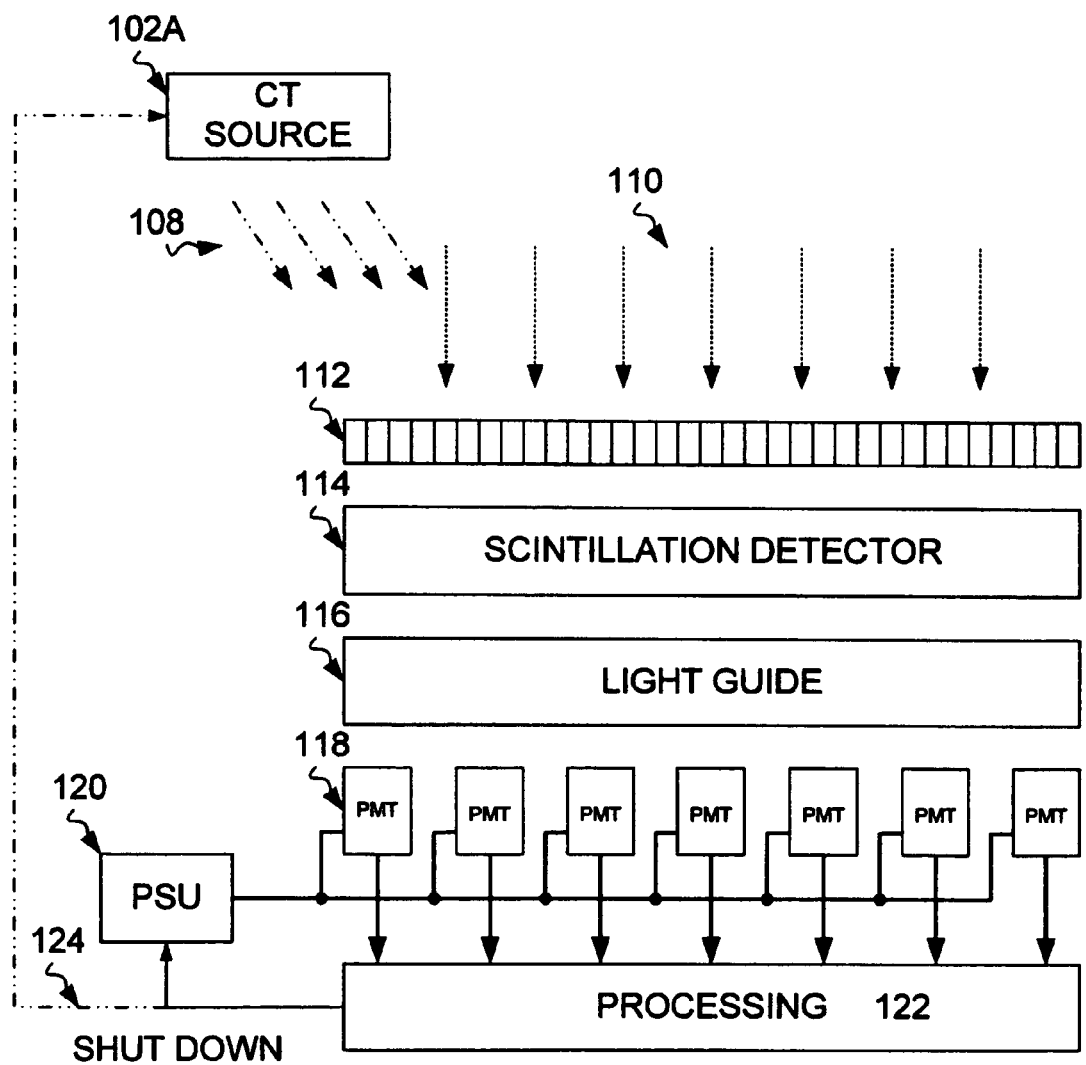
FIG. 2 is a more detailed block diagram primarily of the gamma ray detection circuitry of the SPECT scanner of FIG. 1 in accordance with one or more embodiments of the present invention.

FIG. 2 is detailed block diagram, primarily of a gamma ray detection circuit of the SPECT scanner 104. Portions of the gamma ray detection circuitry are similar to those of U.S. Pat. No. 3,011,057 (to Anger), the entire disclosure of which is incorporated by reference herein. In particular, the gamma ray detection circuit includes a parallel hole collimator 112, a scintillation detector (crystal) 114, a light guide 116, a plurality of photo multiplier tubes (PMTs) 118, a high voltage power supply 120 for the PMTs 118, and post processing circuitry 122.

The parallel hole collimator 112 acts as a guide to channel the gamma rays 110 to the scintillation crystal 114. The scintillation crystal 114 functions as a gamma ray detector by converting the high-energy photons of the gamma rays 110 into visible light (i.e., lower energy photons). When a gamma ray 110 strikes and is absorbed in the scintillation crystal 114, the energy of the gamma ray is converted into flashes of light (i.e., a large number of scintillation photons) that emanate and spread from the point at which the gamma ray 110 is absorbed. The scintillation crystal 114 may be formed from any suitable materials known in the art, such as sodium iodide doped with a trace of thallium (NaI(Tl)) or CsI(Tl). The scintillation photons emitted from the scintillation crystal 114 are typically in the visible light region of the electromagnetic spectrum (and may have a mean value of about 3 eV for NaI(Tl)).

The light guide 116 assists in focusing the scintillation photons from the scintillation crystal 114 to the PMTs 118. The plurality of PMTs 118 are located adjacent to the light guide 116. In one or more embodiments, the number of PMTs may be on the order of about 50 to 100 tubes arranged in a two dimensional array. The basic function of the PMTs 118 is to detect and amplify the scintillation photons (events).

Each PMT 118 is operable to detect a fraction of the scintillation photons emanating from the scintillation crystal 114 and produce an analog output signal (e.g., a current or voltage pulse) having an amplitude that is proportional to the number of detected scintillation photons. Each PMT 118 includes a light sensitive surface, called the photocathode, which emits electrons in proportion to the number of incident scintillation photons. The emitted electrons, also called photoelectrons, are then electrostatically accelerated into an electron multiplying structure of the PMT 118, which causes an electrical current (or voltage) to be developed at an output of the PMT 118. The amplitude of the output signal is proportional to the number of photoelectrons generated in the PMT 118 during the time period that scintillation photons are incident. More specifically, the amplitude of the output signal from each PMT 118 is proportional to two basic factors: (i) the number of scintillation photons detected by the PMT 118, and (ii) the gain of the electron multiplying structure of the PMT 118. Thus, after a gamma ray absorption event at the scintillation crystal 114, a given PMT 118 outputs a signal that can be used (with other signals from other PMTs 118) to determine the location of the gamma ray absorption event.

Assuming that the analog output signals from the PMTs 118 are current signals, such output signals are subject to a current-to-voltage conversion to yield an analog voltage signal. The analog voltage signals are then digitalized using analog to digital ("A/D") converters prior to or as an initial stage in the post processing circuitry 122.

A basic function of the post processing circuitry 122 is to calculate the spatial location and energy level of the incident gamma rays 110 based on the digitized analog output signals from the PMTs 118 and. From such location information, the post processing circuitry 122 is then operable to produce a two dimensional image of the anatomy of the patient 106, which may be displayed on a CRT or other display mechanism. The number of scintillation photons producing output in each PMT 118 is inversely related to the distance of the PMT 118 from the point of gamma ray absorption, or event location, within the scintillation crystal 114. Thus, the post processing circuitry 122 uses this relationship to compute the position of the gamma event from the output signals of a number of the PMTs 118 surrounding the event location.

Further details regarding the basic operation and structure of the gamma ray detection circuitry of the SPECT scanner 104 may be found in U.S. Patent Application Publication No. US2004/0036026 and/or U.S. Pat. No. 6,124,595, the entire disclosures of which are hereby incorporated by reference.

While the SPECT scanner 104 is designed to measure gamma rays, the CT scanner 102 is designed to measure X-rays. In particular, the CT scanner 102 generates an infinite set of X-ray beam projections 108 through the anatomy of the patient 106. The resultant detected X-ray data are computer processed to reconstruct a tomographic image-slice of the anatomy. The CT scanner source 102A generates an X-ray electron beam 108 that scans in an arc-like shape through the patient 106 to the detector array 102B. The detector array 102B may include a relatively large number of detectors (perhaps 2,000-5,000) that sequentially receive at least a portion of the moving beam of X-rays 108. Each detector produces an analog output signal (typically a few nA of current) that is subject to a current-to-voltage conversion to yield an analog signal of perhaps several hundred mV. The analog detector outputs are then digitalized using analog to digital ("A/D") converters. Post processing circuitry of the CT scanner 102 computes the tomographic image-slice of the anatomy from the digitized signals.

Further details regarding the basic operation and structure of the CT scanner 102 may be found in U.S. Pat. No. 5,448,609, the entire disclosure of which is hereby incorporated by reference.

Figure 3A:
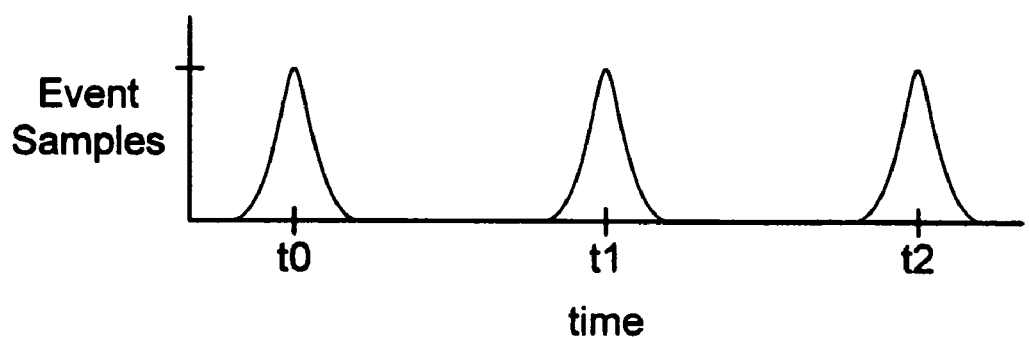
FIG. 3A is graphical illustration of one or more output signals from the photo multiplier tube(s) of the gamma ray detection circuitry of the SPECT scanner in response to incident gamma rays.
Figure 3B:
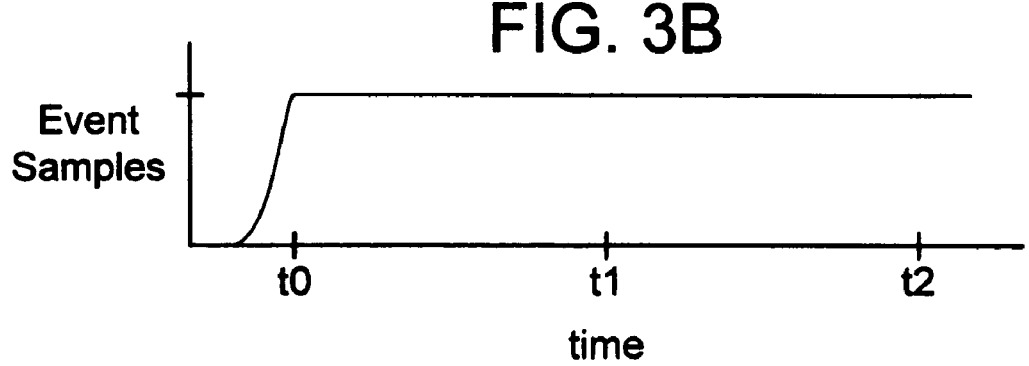
FIG. 3B is graphical illustration of one or more output signals from the photo multiplier tube(s) of the gamma ray detection circuitry of the SPECT scanner in response to incident X-rays.

Reference is now made to FIGS. 3A-3B, which are graphical illustrations of typical output signals from the photo multiplier tubes 118 of the SPECT scanner 104 in response to incident gamma rays (FIG. 3A) and incident X-rays (FIG. 3B). It is noted that there is no physical difference between gamma rays and X-rays of the same energy level—they are just two names for the same electromagnetic radiation. Gamma rays are usually distinguished from X-rays, however, in terms of their origin. "Gamma ray" is a term for high-energy electromagnetic radiation produced by nuclear transitions, while "X-ray" is a term for high-energy electromagnetic radiation produced by energy transitions due to accelerating electrons.

In the context of the gamma rays 110 and X-rays 108 discussed herein, it is assumed that the energy profile of a gamma ray event exhibits a generally Gaussian envelope, as is illustrated in FIG. 3A. The illustrated envelope may represent a number of digitized event samples from the PMTs 118 (post A/D conversion). In a typical SPECT scanning situation, gamma ray events are somewhat random and the Gaussian profile of a given gamma ray event peaks and returns to zero in a time period of about 1 us. In contrast, as shown in FIG. 3B, the X-rays 108 of the CT scanner are produced via electron acceleration and therefore have a much greater energy profile in terms of duration (much greater than 1 us) and often also in terms of amplitude.

As discussed above, the integration of the CT scanner 102 and the SPECT scanner 104 into one piece of equipment may subject the gamma ray detection circuitry of the SPECT scanner 104 to X-rays of significant magnitude. Given the significantly greater energy profile of the X-rays 108, the output of the SPECT scanner 104 may be skewed due to overdriving of the scintillation crystal 114 and the PMTs 118. Assuming that these components are not damaged, it may take a very long time (sometimes hours) for one or both of the scintillation crystal 114 and the PMTs 118 to settle and again become useful in measuring gamma rays 110.

Figure 4:
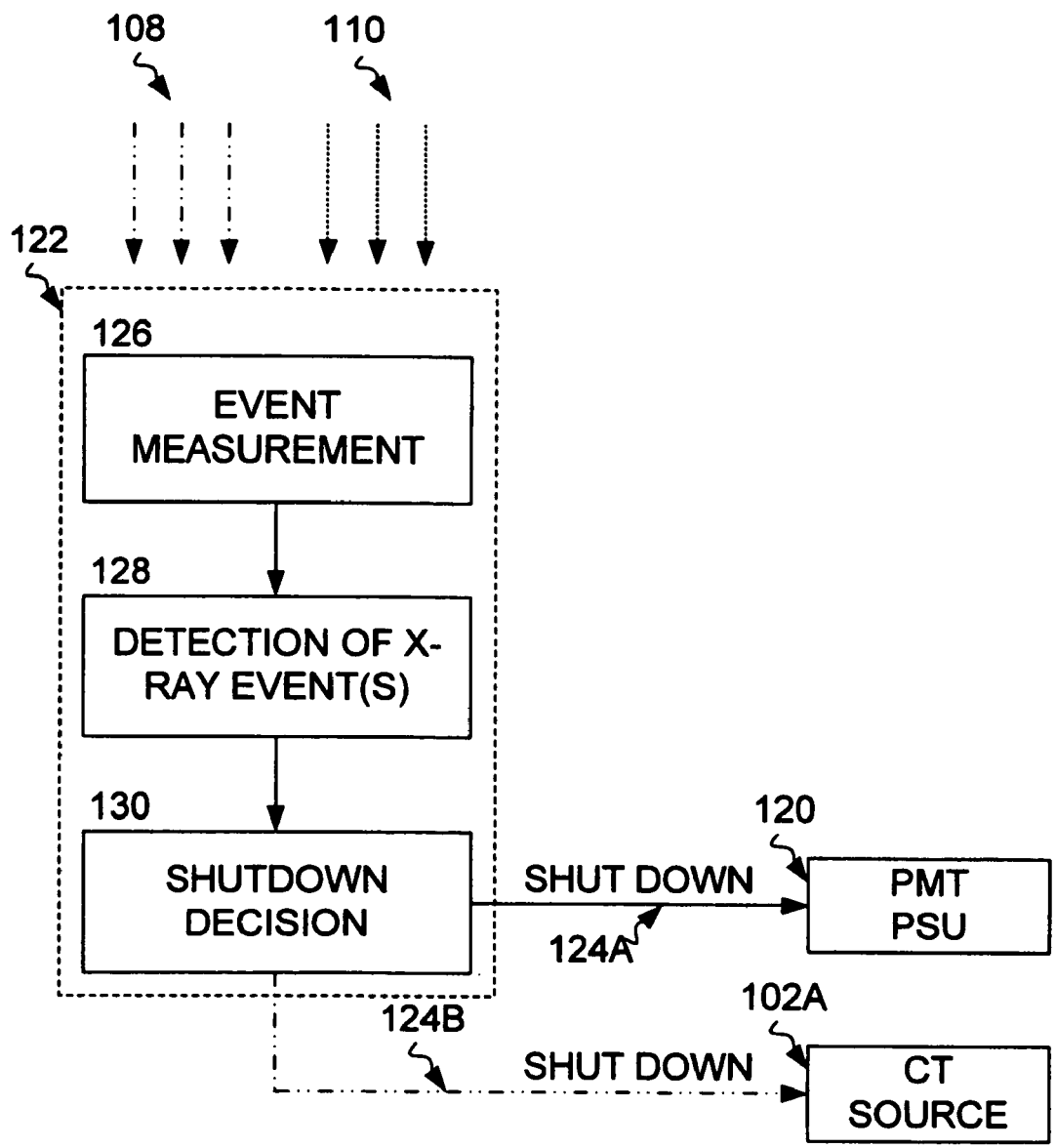
FIG. 4 is a partial block diagram and partial flow diagram of an X-ray detection and shut down aspect in accordance with one or more embodiments of the present invention.

With reference to FIGS. 2 and 4, the diagnostics system 100 includes shutdown circuitry that is operable to determine whether X-rays 108 produced by the CT scanner source 102A have infiltrated the SPECT scanner 104, and to shutdown one or more portions of the system 100 when the determination is affirmative. In one or more embodiments, the post processing circuitry 122 of the SPECT scanner 104 may itself have the capability of determining whether X-rays 108 have infiltrated the SPECT scanner 104. In addition, the post processing circuitry 122 may produce one or more shutdown signals 124 that may be used as an indicator and/or control signal to shutdown, for example, a power source PSU 120 to the one or more PMTs 118 and/or the CT scanner source 102A of the CT scanner 102. In this regard, the post processing circuitry 122 may be implemented utilizing a microprocessor, digital signal processor, etc. that is responsive to computer program code, which code may include the aforementioned capability of determining X-ray infiltration and shutdown decision-making capabilities. Implementing the shutdown circuitry within the post processing circuitry 122 has the advantage of minimizing the hardware, software, real estate, and general integration costs associated with implementing the shutdown function. In alternative embodiments, however, it is noted that the shutdown functionality may be employed using separate circuitry if desired.

With reference to the embodiment illustrated in FIG. 4, the post processing circuitry 122 is capable of event measurement 126, detection of X-ray events 128, and shutdown determination 130. Preferably, these functions are carried out by analyzing one or more of the output signals from the PMTs 118. Thus, the event measurement function 126 may be carried out by monitoring the digitized output signals from one or more of the PMTs 118. The X-ray infiltration detection function 128 may be implemented by programming the post processing circuitry 122 in such a way as to detect differences in the characteristics of the output signals from the PMTs 118. These differences may include those between the gamma ray characteristics illustrated in FIG. 3A and the X-ray characteristics illustrated in FIG. 3B. The shutdown decision function 130 may simply be a logical IF-THEN-ELSE determination resulting in a shutdown command 124A to the power supply PSU 120 to the PMTs 118 and/or a shutdown command 124B to the CT scanner source 102A of the CT Scanner 102.

Figure 5:
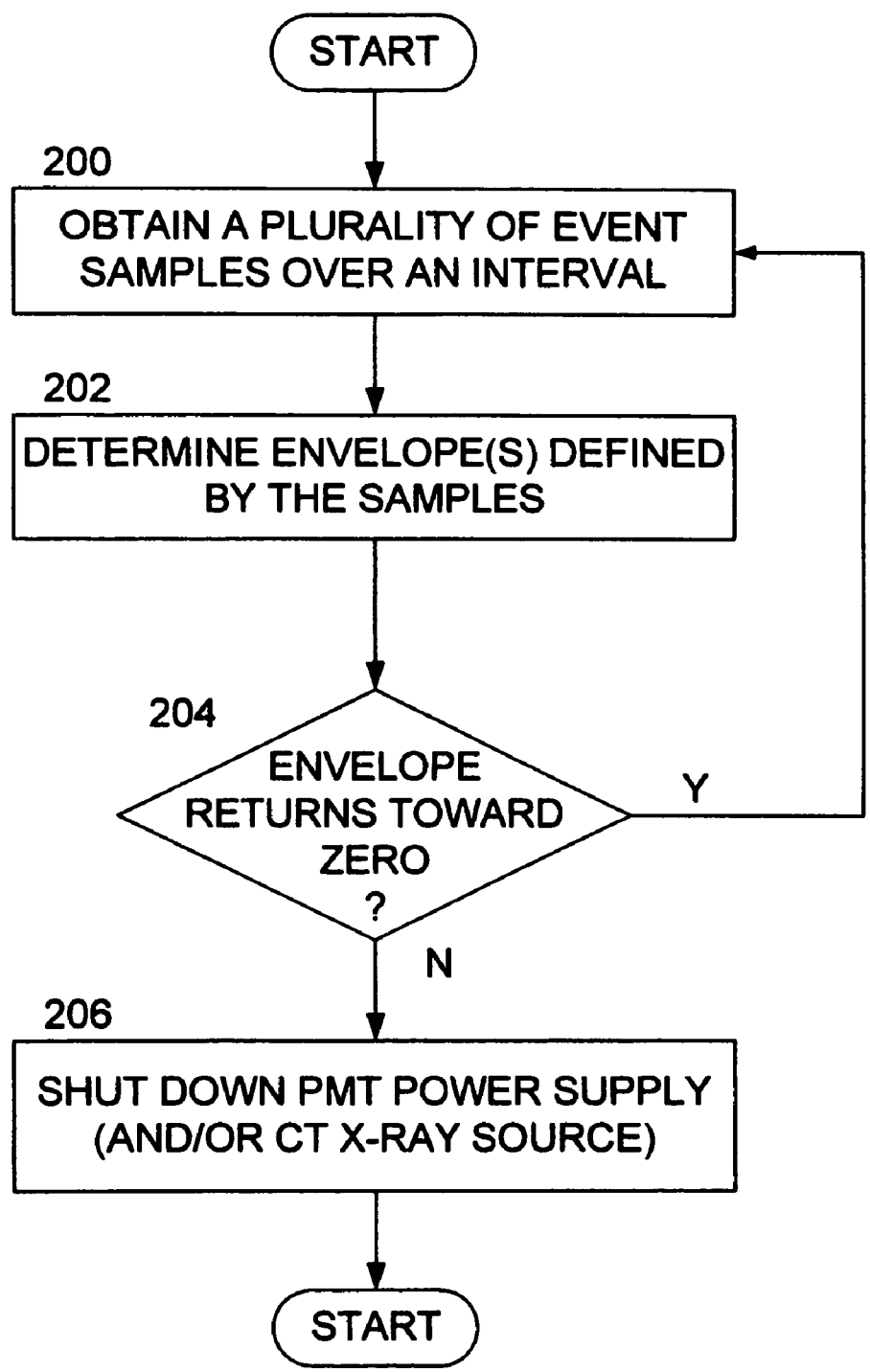
FIG. 5 is a flow diagram of process steps that may be carried out by the X-ray detection and shut down functionality of one or more embodiments of the present invention.

Reference is now made to FIG. 5, which is a flow diagram illustrating process steps that may be carried out by one or more embodiments of the post processing circuitry 122 in order to implement the X-ray infiltration and shutdown capabilities discussed above. It is understood that the illustrated process steps are examples only and are not intended to limit the embodiments of the invention. At action 200, the post processing circuitry 122 may obtain a plurality of event samples from the PMTs 118 over an interval of time. By way of example, the output signals of the PMTS may be sampled at about 30 MHz and the interval may be between about 1 ms to 100 ms, where 40 ms to 50 ms is preferred.

It is noted that some existing systems employ the 30 MHz sampling rate to obtain samples used to compute the energy of the gamma events, e.g., the area under the envelope curves illustrated in FIG. 3A. The energies of the events may also be aggregated to produce energy summations, so called E-SUMS. The energy and E-SUMs are used, among other things, to compute the afterglow of the scintillation crystal 114, etc. A higher sampling rate, such as 120 MHz, has also been used to obtain a better quality sample detection, which may be used to compute the X-Y positions of the events. In the context of obtaining a plurality of event samples from the PMTs 118 over an interval of time as in action 200, either of the 30 MHz or 120 MHz sampling rate, or other sampling rate, may be employed.

At action 202, the post processing circuitry 122 may be operable to determine respective envelopes defined by the samples. For example, envelopes as illustrated in FIG. 3A may be detected when gamma rays 110 are incident on the scintillation crystal 114. In contrast, the envelope illustrated in FIG. 3B may be determined by the post processing circuitry 122 when X-rays 108 are incident on the scintillation crystal 114. The detection of X-ray events function 128 of the post processing circuitry 122 may be carried out in action 204 by determining whether the envelope returns to or toward a reference level (e.g., zero volts) during the time interval. Indeed, as illustrated in FIG. 3A, if the envelope returns to or toward zero in, for example, the time interval from t0 to t1, or t1 to t2, then it may be assumed that gamma rays 110 are incident on the scintillation crystal 114. Accordingly, the process flow from action 204 may loop back to action 200 and repeat. On the other hand, if it is determined that the envelope of the event samples do not return to or towards zero in the time interval, the process flow may branch to action 206, where one or more shutdown signals 124 are produced to shutdown the power supply PSU 120 to the PMTs 118 and/or to shutdown the CT scanner source 102A.

Figure 6:
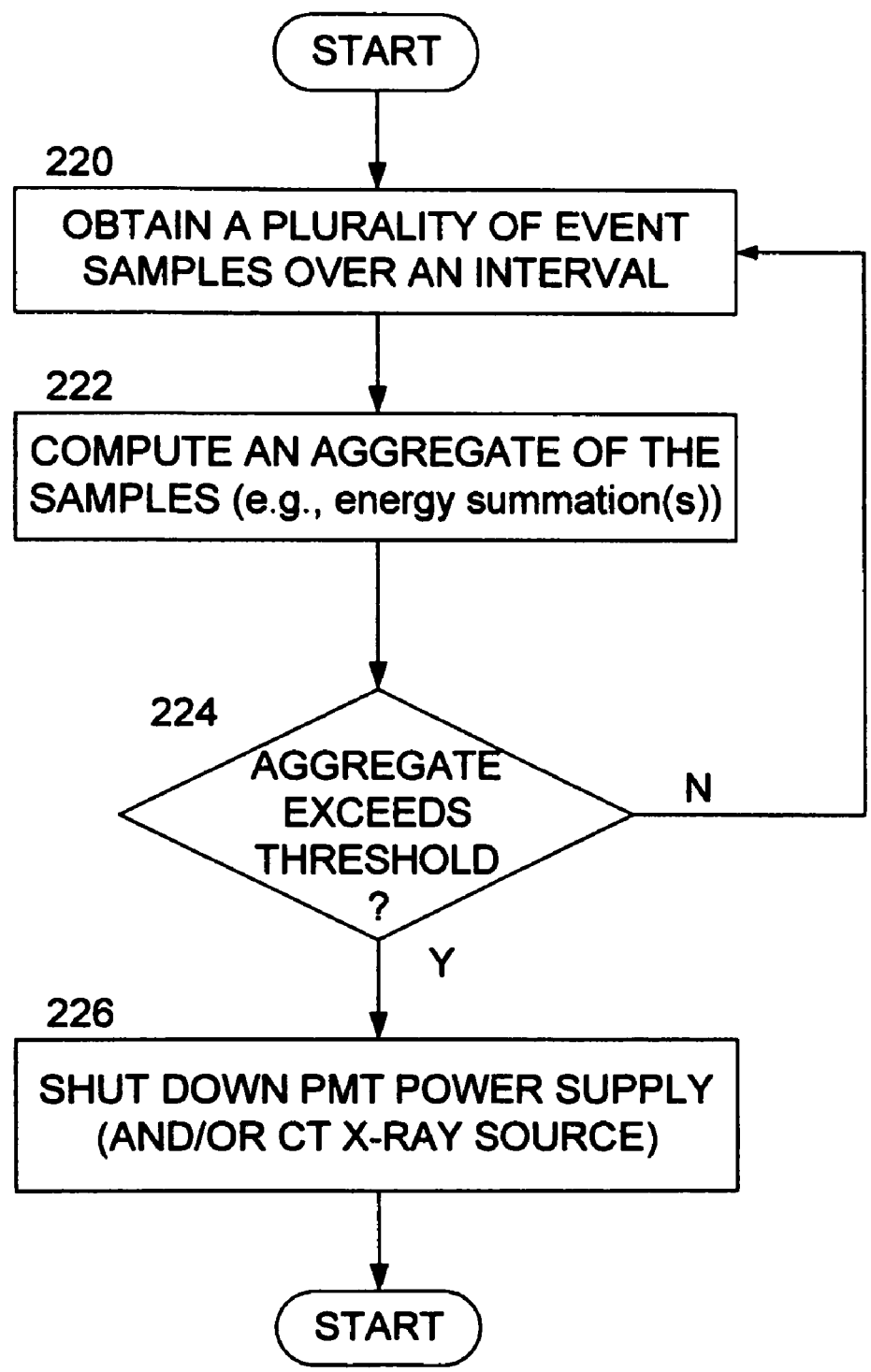
FIG. 6 is a flow diagram of alternative (or additional) process steps that may be carried out by the X-ray detection and shut down functionality of one or more embodiments of the present invention.

Reference is now made to FIG. 6, which is a flow diagram illustrating an alternative, or additional, process that may be carried out by the post processing circuitry 122 in order to implement the X-ray infiltration and shut down functionality. Again, it is understood that the illustrated process steps are examples only and are not intended to limit embodiments of the invention. At action 220, the post processing circuitry 122 may obtain a plurality of event samples from the PMTs 118 over an interval of time. As discussed in the previous embodiment, the output signals of the PMTs may be sampled at about 30 MHz, 120 MHz, or some other sampling rate, over an interval of between about 1 ms to 100 ms, such as 40 ms to 50 ms.

At action 222, the post processing circuitry 122 may be operable to determine whether the respective energy levels for the one or more output signals from the PMTs 118 exceed a threshold. For example, the samples may be summed (effectively taking an integral of the envelopes as illustrated in FIG. 3A or 3B). Alternatively, or additionally, the aforementioned E-SUMs (which might already be computed in the normal course of operation) may be evaluated. When gamma rays 110 are incident on the scintillation crystal 114, the level of the sample summations, energy computation, E-SUMs, etc. will be a relatively normal level, which are much lower than would exist if X-rays 108 are incident on the scintillation crystal 114. The detection of X-ray events function 128 of the post processing circuitry 122 may be carried out in action 224 by determining whether metric (sample summations, energy computation, E-SUMs, etc.) exceeds a threshold that is relatively higher than would be expected for gamma ray events. If the determination at action 224 is negative, then the process flow may loop back to action 220 and repeat. On the other hand, if the determination at action 224 is affirmative (X-rays are present), then the process flow may branch to action 226, where one or more shutdown signals 124 are produced to shutdown the power supply PSU 120 to the PMTs 118 and/or to shutdown the CT scanner source 102A.

Figure 7:
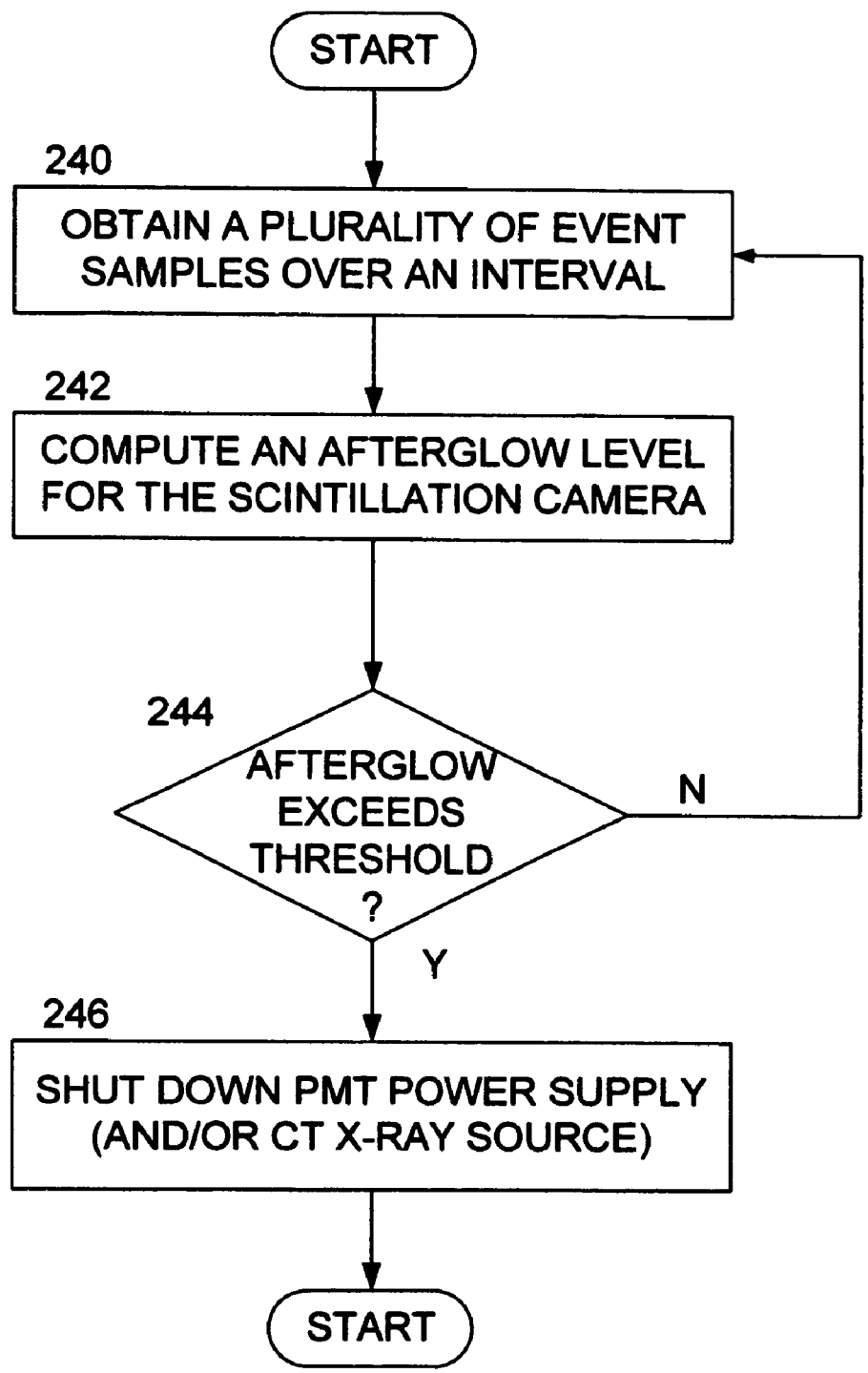
FIG. 7 is a flow diagram of further alternative (or additional) process steps that may be carried out by the X-ray detection and shut down functionality of one or more embodiments of the present invention.

Reference is now made to FIG. 7, which is a flow diagram illustrating an alternative, or additional, process that may be carried out by the post processing circuitry 122 in order to implement the X-ray infiltration and shut down functionality. Again, it is understood that the illustrated process steps are examples only and are not intended to limit embodiments of the invention. At action 240, the post processing circuitry 122 may obtain a plurality of event samples from the PMTs 118 over an interval of time. As discussed in the previous embodiment, the output signals of the PMTs may be sampled at any reasonable sampling rate, over a reasonable interval of time.

At action 242, the post processing circuitry 122 may be operable to determine whether the computed afterglow of the scintillation crystal 114 is above a threshold. The afterglow is an indication of the residual spectral decay after one or more events and is sometimes defined as the fraction of scintillation light still present for a certain time after the event ceases. The energy content of the events as measure by the samples is used to compute the expected afterglow so that afterglow errors may be corrected in subsequent measurements. When gamma rays 110 are incident on the scintillation crystal 114, the computed afterglow will be a relatively normal level, which is much lower than would exist if X-rays 108 are incident on the scintillation crystal 114. The detection of X-ray events function 128 of the post processing circuitry 122 may be carried out in action 244 by determining whether the afterglow exceeds a threshold that is relatively higher than would be expected for gamma ray events. If the determination at action 244 is negative, then the process flow may loop back to action 240 and repeat. On the other hand, if the determination at action 244 is affirmative (X-rays are present), then the process flow may branch to action 246, where one or more shutdown signals 124 are produced to shutdown the power supply PSU 120 to the PMTs 118 and/or to shutdown the CT scanner source 102A.

Those skilled in the art will appreciate that other metrics determined from the output signals of the PMTs 118 may be employed as an indicator of X-ray infiltration, which are considered within the scope of the present invention.

Although the invention herein has been described with reference to various embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
   determining whether X-rays produced by a computer tomography (CT) scanner have infiltrated a single photon emission computed tomography (SPECT) scanner; and
   shutting down at least one of: (i) a power source to one or more photo-multiplier tubes (PMTs) of the SPECT scanner; and (ii) an X-ray source of the CT scanner, when the determination is affirmative.

2. The method of claim 1, further comprising integrating the CT scanner and the SPECT scanner in a single piece of equipment.

3. The method of claim 1, wherein the step of determining whether there has been X-ray infiltration includes: determining whether one or more output signals from the PMTs of the SPECT scanner indicate X-ray infiltration.

4. The method of claim 3, wherein the step of determining whether the one or more output signals from the PMTs indicate X-ray infiltration includes obtaining an indication of a respective amplitude envelope for each of the one or more output signals from the PMTs.

5. The method of claim 4, wherein the step of determining whether the one or more output signals from the PMTs indicate X-ray infiltration includes determining whether the respective amplitude envelopes return to or toward a reference level within a time interval.

6. The method of claim 5, wherein the determination of whether the one or more output signals from the PMTs indicate X-ray infiltration is affirmative when the respective amplitude envelopes do not return to or toward the reference level within the time interval.

7. The method of claim 5, wherein the time interval is between about 1 ms to about 100 ms.

8. The method of claim 3, wherein the step of determining whether the one or more output signals from the PMTs indicate X-ray infiltration includes obtaining an indication of a respective energy level for each of the one or more output signals from the PMTs over a time interval.

9. The method of claim 8, wherein the step of determining whether the one or more output signals from the PMTs indicate X-ray infiltration includes determining whether the respective energy levels for the one or more output signals from the PMTs exceed a threshold.

10. The method of claim 9, wherein the threshold is substantially higher than expected energy levels of the one or more output signals from the PMTs in response to a presence of gamma rays.

11. The method of claim 9, wherein the determination of whether the one or more output signals from the PMTs indicate X-ray infiltration is affirmative when the respective energy levels for the one or more output signals from the PMTs exceed the threshold.

12. The method of claim 8, wherein the time interval is between about 1 ms to about 100 ms.

13. The method of claim 3, wherein the step of determining whether the one or more output signals from the PMTs indicate X-ray infiltration includes obtaining an indication of an afterglow of a scintillation crystal of the SPECT scanner.

14. The method of claim 13, wherein the determination that X-ray infiltration is affirmative when the afterglow exceeds a threshold.

15. The method of claim 14, wherein the threshold is substantially higher than an expected afterglow of the scintillation crystal in response to a presence of gamma rays.

16. An apparatus, comprising:
a computer tomography (CT) scanner;
a single photon emission computed tomography (SPECT) scanner; and
a shut down circuit operable to determine whether X-rays produced by the CT scanner have infiltrated the SPECT scanner and to shut down at least one of: (i) a power source to one or more photo-multiplier tubes (PMTs) of the SPECT scanner; and (ii) an X-ray source of the CT scanner, when the determination is affirmative.

17. The apparatus of claim 16, wherein the CT scanner and the SPECT scanner are integrated into a single piece of equipment.

18. The apparatus of claim 16, wherein the determination function of the shut down circuit is implemented using PMT post processing circuitry of the SPECT scanner.

19. The apparatus of claim 16, wherein the shut down circuit is operable to determine whether one or more output signals from the PMTS of the SPECT scanner indicate X-ray infiltration.

20. The apparatus of claim 19, wherein the shut down circuit is operable to:
obtain an indication of a respective amplitude envelope for each of the one or more output signals from the PMTs; and
determine whether the respective amplitude envelopes return to or toward a reference level within a time interval.

21. The apparatus of claim 20, wherein the shut down circuit is operable to determine that X-ray infiltration is affirmative when the respective amplitude envelopes do not return to or toward the reference level within the time interval.

22. The apparatus of claim 20, wherein the time interval is between about 1 ms to about 100 ms.

23. The apparatus of claim 19, the shut down circuit is operable to obtain an indication of a respective energy level for each of the one or more output signals from the PMTs over a time interval.

24. The apparatus of claim 23, wherein the shut down circuit is operable to determine whether the respective energy levels for the one or more output signals from the PMTs exceed a threshold.

25. The apparatus of claim 24, wherein the threshold is substantially higher than expected energy levels of the one or more output signals from the PMTs in response to a presence of gamma rays.

26. The apparatus of claim 24, wherein the shut down circuit is operable to determine that X-ray infiltration is affirmative when the respective energy levels for the one or more output signals from the PMTs exceed the threshold.

27. The apparatus of claim 23, wherein the time interval is between about 1 ms to about 100 ms.

28. The apparatus of claim 19, wherein the shut down circuit is operable to determine obtain an indication of an afterglow of a scintillation crystal of the SPECT scanner.

29. The apparatus of claim 28, wherein the shut down circuit is operable to determine that X-ray infiltration is affirmative when the afterglow exceeds a threshold.

30. The apparatus of claim 29, wherein the threshold is substantially higher than an expected afterglow of the scintillation crystal in response to a presence of gamma rays.

31. An apparatus, comprising:
a computer tomography (CT) scanner integrated with a single photon emission computed tomography (SPECT) scanner as a single unit;
means for determining whether X-rays have infiltrated the SPECT scanner; and
means for shutting down at least one of: (i) a power source to one or more photo-multiplier tubes (PMTs) of the SPECT scanner; and (ii) an X-ray source of the CT scanner, when the determination is affirmative.

* * * * *